United States Patent
Umemoto et al.

(10) Patent No.: US 9,387,507 B2
(45) Date of Patent: Jul. 12, 2016

(54) METHOD FOR MANUFACTURING WATER RESISTANT OPTICALLY ANISOTROPIC FILM, AND WATER RESISTANT OPTICALLY ANISOTROPIC FILM

(71) Applicant: NITTO DENKO CORPORATION, Ibaraki-shi, Osaka (JP)

(72) Inventors: Toru Umemoto, Ibaraki (JP); Satoshi Hirata, Ibaraki (JP); Sadahiro Nakanishi, Ibaraki (JP); Shoichi Matsuda, Ibaraki (JP); Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 142 days.

(21) Appl. No.: 13/706,724

(22) Filed: Dec. 6, 2012

(65) Prior Publication Data

US 2013/0149557 A1 Jun. 13, 2013

(30) Foreign Application Priority Data

Dec. 7, 2011 (JP) ................................. 2011-267781

(51) Int. Cl.
*C09B 31/02* (2006.01)
*B05D 1/18* (2006.01)
*G02B 5/30* (2006.01)

(52) U.S. Cl.
CPC ................ *B05D 1/18* (2013.01); *G02B 5/3083* (2013.01)

(58) Field of Classification Search
CPC ........................................................ C09B 31/02
USPC ...................................................... 534/836
See application file for complete search history.

(56) References Cited

U.S. PATENT DOCUMENTS

| | | | |
|---|---|---|---|
| 8,323,538 B2 | 12/2012 | Ogomi et al. | |
| 8,491,823 B2 | 7/2013 | Miyazaki et al. | |
| 8,785,607 B2 | 7/2014 | Umemoto et al. | |
| 2006/0001808 A1 | 1/2006 | Shinohara | |
| 2007/0126983 A1 | 6/2007 | Godeau et al. | |
| 2009/0051058 A1 | 2/2009 | Ogomi et al. | |
| 2010/0314784 A1 | 12/2010 | Miyazaki et al. | |
| 2011/0097483 A1 | 4/2011 | Umemoto et al. | |
| 2011/0134526 A1 | 6/2011 | Umemoto et al. | |
| 2011/0205629 A1 | 8/2011 | Umemoto et al. | |
| 2011/0317102 A1* | 12/2011 | Ramirez et al. | 349/96 |

FOREIGN PATENT DOCUMENTS

| | | | |
|---|---|---|---|
| JP | 09-230142 A | | 9/1997 |
| JP | 11-021538 A | | 1/1999 |
| JP | 2011-021538 | * | 1/1999 |
| JP | 2006-276236 A | | 10/2006 |
| JP | 2007-156464 A | | 6/2007 |
| JP | 2007-178993 A | | 7/2007 |
| JP | 2007-241267 A | | 9/2007 |
| JP | 2008-165200 A | | 7/2008 |
| JP | 2009-134017 A | | 6/2009 |
| JP | 2009-199075 | * | 9/2009 |
| JP | 2009-199075 A | | 9/2009 |
| JP | 2010-026479 A | | 2/2010 |
| JP | 2010-044130 A | | 2/2010 |
| JP | 2010-156937 A | | 7/2010 |
| JP | 2010-266507 A | | 11/2010 |
| WO | 2004/077131 A2 | | 9/2004 |
| WO | 2008/027468 A2 | | 3/2008 |
| WO | 2009/101849 A1 | | 8/2009 |

OTHER PUBLICATIONS

Japanese Office Action dated Aug. 22, 2013, issued in Japanese Patent Application No. 2010-200488, w/English translation.
US Non-Final Office Action dated May 10, 2013, issued in U.S. Appl. No. 13/208,931 (13 pages).
US Final Office Action dated Oct. 9, 2013, issued in U.S. Appl. No. 13/208,931 (9 pages).
US Notice of Allowance dated Apr. 15, 2014, issued in U.S. Appl. No. 13/208,931 (7 pages).
Office Action dated Jun. 12, 2015, issued in counterpart Japanese application No. 2011-267781, w/partial English translation (6 pages).

* cited by examiner

*Primary Examiner* — Yong Chu
*Assistant Examiner* — Sonya Wright
(74) *Attorney, Agent, or Firm* — Westerman, Hattori, Daniels & Adrian, LLP

(57) ABSTRACT

A method for manufacturing a water resistant optically anisotropic film capable of suppressing the generation of a defect such as a crack or separation is provided. The method for manufacturing the water resistant optically anisotropic of the present invention includes a water resistant treatment step of bringing an optically anisotropic film containing an organic dye having an anionic group into contact with a water resistant treatment liquid containing a multivalent cationic compound and a monovalent cationic compound, and the mass ratio of the multivalent cationic compound and the monovalent cationic compound contained in the water resistant treatment liquid, monovalent cationic compound/multivalent cationic compound, is 0.01 to 2.

3 Claims, 1 Drawing Sheet

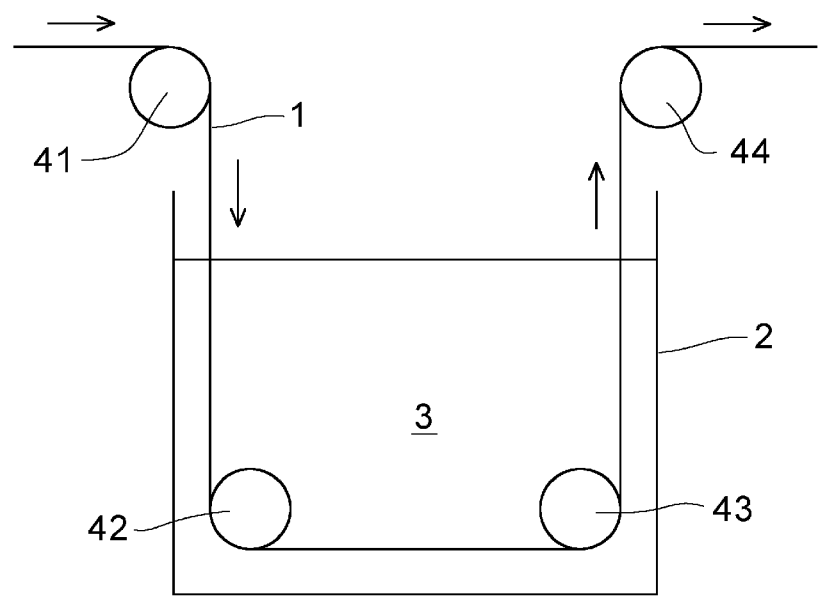

METHOD FOR MANUFACTURING WATER RESISTANT OPTICALLY ANISOTROPIC FILM, AND WATER RESISTANT OPTICALLY ANISOTROPIC FILM

TECHNICAL FIELD

The present invention relates to a method for manufacturing a water resistant optically anisotropic film and the like.

BACKGROUND ART

Conventionally, there has been known an optically anisotropic film containing an organic dye having a sulfonic acid group.

This optically anisotropic film is obtained, for example, by coating a solution containing the organic dye and water on a base material, followed by drying.

The optically anisotropic film containing an organic dye having a sulfonic acid group is inferior in water resistant. Therefore, it is known that this film is subjected to a water resistant treatment.

Patent Document 1 discloses that a film containing an organic dye having a sulfonic acid group is made water resistant by bringing the film into contact with a solution containing a metal salt such as a barium salt.

Patent Document 2 discloses that a film containing an organic dye having an anionic group is made water resistant by bringing the film into contact with an insolubilizing liquid containing a cationic compound with a value obtained by dividing the molar volume by the valence of 30 cm$^3$/mol or more and having two or more valences.

However, in these methods, it is difficult to control the reaction rate in the water resistant treatment. Therefore, due to the fact that the reaction rate is too high, a defect that a crack is generated in the film, or in the case where the optically anisotropic film is formed on a base material, the film is separated from the base material, is generated.

Patent document 1: JP-A-11-21538
Patent document 2: JP-A-2009-199075

SUMMARY OF INVENTION

An object of the present invention is to provide a method for manufacturing a water resistant optically anisotropic film capable of suppressing the generation of a defect such as a crack or separation.

The present inventors have been conjectured a cause of the generation of a defect such as a crack and separation in the water resistant treatment, as follows.

First, water resistance of the optically anisotropic film is achieved by the following mechanism. Specifically, a counter ion bonded to an anionic group of the organic dye undergoes an ion-exchange reaction with a cation of the multivalent cationic compound in the water resistant treatment liquid, whereby the organic dyes are crosslinked with the multivalent cationic compound. The organic dyes constituting the optically anisotropic film are crosslinked, whereby a water resistant optically anisotropic film that is difficult to dissolve in water is obtained.

It is considered that the optically anisotropic film undergoes volume change such as expansion or contraction with this ion-exchange reaction. Moreover, when the reaction rate of the ion-exchange reaction is too high, the film undergoes rapid volume change. As a result, a defect that a crack is generated in the optically anisotropic film, or in the case where the optically anisotropic film is formed on a base material, the film is separated from the base material, is generated.

Under such a conjecture, the present inventors have repeated trials and errors to appropriately control the reaction rate in the water resistant treatment, thereby completing the present invention.

The method for manufacturing a water resistant optically anisotropic film of the present invention includes a water resistant treatment step of bringing an optically anisotropic film containing an organic dye having an anionic group into contact with a water resistant treatment liquid containing a multivalent cationic compound and a monovalent cationic compound, wherein the mass ratio of the multivalent cationic compound and the monovalent cationic compound contained in the water resistant treatment liquid, monovalent cationic compound/multivalent cationic compound, is from 0.01 to 2.

In a preferable method for manufacturing a water resistant optically anisotropic film, the monovalent cationic compound is an alkali metal salt.

In another preferable method for manufacturing a water resistant optically anisotropic film, the monovalent cationic compound is an amine compound.

In another aspect of the present invention, a water resistant optically anisotropic film is provided. This water resistant optically anisotropic film is obtained by any one of the methods described above.

According to the manufacturing method of the present invention, a water resistant optically anisotropic film in which a defect such as a crack or separation is suppressed can be obtained. The optically anisotropic film is subjected to a water resistant treatment, and thus is excellent in water resistance. The optically anisotropic film with excellent water resistance of the present invention is incorporated, for example, into an image display device, whereby an image display device in which display performance does not change over a long period of time can be provided.

BRIEF DESCRIPTION OF THE DRAWINGS

FIG. 1 is a referential side view of an apparatus for water resistant treatment of an optically anisotropic film.

DESCRIPTION OF EMBODIMENTS

[Summary of Method for Manufacturing Water Resistant Optically Anisotropic Film]

The manufacturing method for a water resistant optically anisotropic film of the present invention includes a water resistant treatment step of bringing an optically anisotropic film containing an organic dye having an anionic group into contact with a water resistant treatment liquid containing a multivalent cationic compound and a monovalent cationic compound, wherein the mass ratio of the multivalent cationic compound and the monovalent cationic compound contained in the water resistant treatment liquid (monovalent cationic compound/multivalent cationic compound) is from 0.01 to 2.

In general, the manufacturing method of the present invention has a film-forming step of forming an optically anisotropic film, prior to the water resistant treatment step.

Incidentally, in the present specification, the wording "X to Y" means that "X or more and Y or less".

[Film-Forming Step]

The film-forming step is a step of obtaining an optically anisotropic film containing an organic dye having an anionic group.

In the film-forming step, an optically anisotropic film is obtained by coating a coating liquid containing an organic dye having an anionic group, onto a development surface to form a coating film containing the organic dye and solidifying this coating film.

(Regarding Organic Dye Having Anionic Group)

The organic dye having an anionic group is a dye that can dissociate when dissolved in water to exhibit anionic properties.

The organic dye used in the present invention is not particularly limited so far as it is an organic dye having one or more anionic groups in a molecule thereof, and an organic dye having two or more anionic groups is preferably used.

Examples of a basic structure of the organic dye include azo-based, cyanine-based, merocyanine-based, perylene-based, naphthoquinone-based, and the like. It is preferable to use an azo-based organic dye in view of the fact that it exhibits good lyotropic liquid crystallinity.

Incidentally, the azo-based organic dye is an organic dye having one or more azo groups in a molecule thereof. Among them, it is preferable to use a disazo-based organic dye having two or more azo groups.

The organic dye has a fixed anionic group bonded to a skeleton of the organic dye, and in general, a counter ion is bonded to the fixed anionic group.

The counter ion includes a cationic species such as a metal ion and a hydrogen ion.

The anionic group includes a sulfonic acid group, a carboxyl group, a phosphate group, a hydroxyl group, salt groups thereof, and the like. The anionic group is preferably a sulfonic acid group or a sulfonate group (—SO$_3$M group), and further preferably a sulfonate group. Here, M represents a counter ion.

The number of anionic group (substitution number) in the organic dye is not particularly limited, but preferably two or more, and more preferably 2 to 5, and further preferably 2 to 4.

The organic dye having two or more anionic groups is high in affinity with any aqueous solvent. Thus, the organic dye can be dissolved in an aqueous solvent, so that a good coating liquid can easily be prepared. The use of this coating liquid makes it possible to yield an optically anisotropic film excellent in orientation.

It is considered that when subjected to a water resistant treatment, the two or more anionic groups act to generate plural crosslinking points with the multivalent cationic compound. For this reason, the organic dye having two or more anionic groups can form a rigid supermolecule in which its orientation has little irregularity. An optically anisotropic film constituted by the organic dye having two or more anionic groups is excellent in water resistance.

Examples of the organic dye include compounds described in JP 2007-126628 A and the like.

When the organic dye has two or more anionic groups bonded to a benzene ring, it is preferred that the positions of the respective anionic groups be not adjacent to each other (not at the ortho-position). In particular, it is further preferred that the respective anionic groups be positioned at the meta-position. In the organic dye in which the anionic groups are positioned at the meta-position each other, a steric hindrance between the anionic groups is small. For this reason, the organic dye is easy to orient substantially linearly before and after the water resistant treatment.

The organic dye is, for example, preferably an azo compound represented by the following general formulae (1-1), (1-2), (2-1) or (2-2).

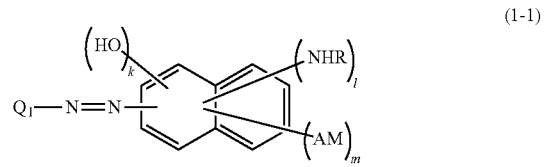
(1-1)

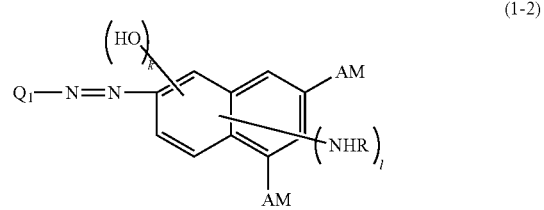
(1-2)

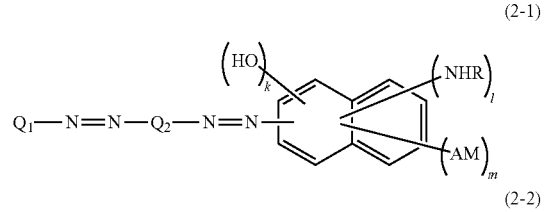
(2-1)

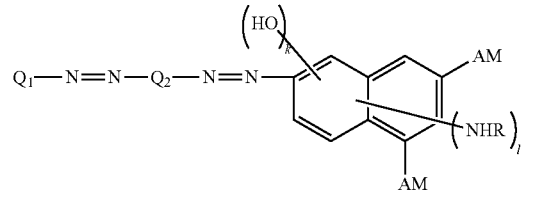
(2-2)

In the general formulae (1-1), (1-2), (2-1) and (2-2), $Q_1$ represents a substituted or unsubstituted aryl group, $Q_2$ represents a substituted or unsubstituted arylene group, A represents an anionic group, M represents a counterion of the anionic group, R represents a hydrogen atom, a substituted or unsubstituted alkyl group, a substituted or unsubstituted acetyl group, a substituted or unsubstituted benzoyl group, or a substituted or unsubstituted phenyl group, k represents an integer of 0 to 4, l represents an integer of 0 to 4, and m represents an integer of 1 to 6. Here, in the formulae (1-1) and (2-1), k+l+m≤7 and in the formulae (1-2) and (2-2), k+l≤5. In the present specification, the wording "substituted or unsubstituted" means that "a certain group is substituted with a substituent, or is not substituted with any substituent".

In addition, in the general formulae (1-1), (1-2), (2-1) and (2-2), substituents of (NHR)$_l$ and (AM)$_m$ may be respectively substituted in any position in the naphthalene ring.

The aryl group or arylene group represented by $Q_1$ or $Q_2$ may have a substituent or no substituent. In each case whether the aryl group or the arylene group represented by $Q_1$ or $Q_2$ is substituted or not substituted, the azo compound represented by each of the general formulae exhibits absorptive dichroism.

$Q_1$ and $Q_2$ are the aryl group or the arylene group without an azo bonding (—N=N—).

When the aryl group or the arylene group has a substituent, the substituent is, for example, a halogeno group, a nitro group, a cyano group, a dihydroxy propyl group, a phenyl amino group, —OM, —COOM, —SO$_3$M, an alkyl group having 1 to 6 carbon atoms, an alkoxy group having 1 to 6 carbon atoms, an alkyl amino group having 1 to 6 carbon atoms, an acyl amino group having 1 to 6 carbon atoms, and the like. The substituent is preferably an anionic group such as a nitro group or a —SO$_3$M group. Here, M represents a counterion.

When the alkyl group, the acetyl group, the benzoyl group or the phenyl group represented by R in the general formulae (1-1), (1-2), (2-1) and (2-2) has a substituent, examples of the substituent include the same substituents as given as examples in the description column of the aryl group or the arylene group.

Examples of R as the alkyl group include the alkyl group having 1 to 6 carbon atoms.

As examples of the aryl group, a condensed ring group where a benzene ring is condensed, such as a naphthyl group in addition to a phenyl group can be cited.

As examples of the arylene group, a condensed ring group where a benzene ring is condensed, such as a naphthylene group in addition to a phenylene group can be cited.

$Q_1$ in the general formulae (1-1), (1-2), (2-1) and (2-2) is preferably a substituted or unsubstituted phenyl group, more preferably a phenyl group having a substituent, and further preferably a phenyl group having a substituent at least at a para-position.

$Q_2$ in the general formulae (2-1) and (2-2) is preferably a substituted or unsubstituted naphthylene group and more preferably a substituted or unsubstituted 1,4-naphthylene group.

A in the general formulae (1-1), (1-2), (2-1) and (2-2) is, for example, a sulfonic acid group, a carboxyl group, a phosphate group, or salt groups thereof. A is preferably a sulfonic acid group or a sulfonate and more preferably a sulfonate.

M in the general formulae (1-1), (1-2), (2-1) and (2-2) is a hydrogen ion, an alkali metal ion, an alkaline earth metal ion, a metal ion other than the alkali metal ion and the alkaline earth metal ion, or an ammonium ion that may be substituted with an alkyl group or a hydroxyl alkyl group, a salt of an organic amine, and the like. After the optically anisotropic film containing at least one type of the azo compound represented by each general formula described above is subjected to a water resisting treatment, a partial amount or the total amount of M in each of the general formulae turns to cationic species originating from the multivalent cationic compound in the water resisting treatment liquid.

R in the general formulae (1-1), (1-2), (2-1) and (2-2) is preferably a hydrogen atom or a substituted or unsubstituted alkyl group having 1 to 4 carbon atoms, and preferably a hydrogen atom.

Furthermore, k in the general formulae (1-1), (1-2), (2-1) and (2-2) is preferably an integer of 0 to 2 and more preferably an integer of 1 to 2. In the general formulae (1-1), (1-2), (2-1) and (2-2), 1 is preferably an integer of 0 to 2 and more preferably an integer of 0 to 1. In the general formulae (1-1), (1-2), (2-1) and (2-2), m is preferably an integer of 1 to 4 and more preferably an integer of 2 to 4.

The organic dye is more preferably an azo compound represented by the following general formulae (2-3) or (2-4).

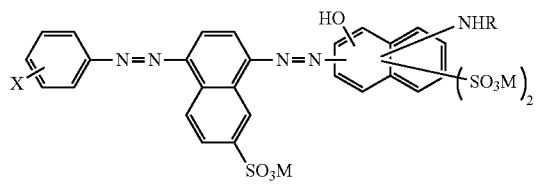

(2-3)

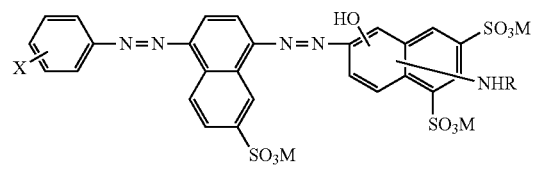

(2-4)

In the general formulae (2-3) and (2-4), X represents a hydrogen atom, a halogen atom, a nitro group, a cyano group, a substituted or unsubstituted alkyl group having 1 to 4 carbon atoms, a substituted or unsubstituted alkoxy group having 1 to 4 carbon atoms, or a —$SO_3M$ group.

R and M in the general formulae (2-3) and (2-4) are identical with R and M in the general formula (2-1), respectively.

When the alkyl group having 1 to 4 carbon atoms or the alkoxy group having 1 to 4 carbon atoms represented by X in the general formulae (2-3) and (2-4) has a substituent, examples of the substituent include the same substituents as given as examples in the description column of the aryl group.

X in the general formula (2-3) and (2-4) is preferably a hydrogen atom, a nitro group, or a cyano group, and more preferably a nitro group.

In addition, in the general formulae (2-3) and (2-4), the substituent of NHR and $SO_3M$ may be respectively substituted in any position in the naphthalene ring.

The organic dye such as the azo compound described above exhibits a liquid crystallinity (lyotropic liquid crystallinity) in a state where the organic dye is dissolved in a solvent. Specifically, the organic dye forms supermolecules when the organic dye is dissolved in the solvent. When a liquid containing the organic dye flows and spreads in a predetermined direction, a shear force is applied to the supermolecules. As a result, a coating film where the long axes of the supermolecules are oriented in the direction in which the liquid flows and spreads can be formed. The obtained coating film has an optical anisotropic property since the organic dye is oriented in the predetermined direction.

The azo compound represented by each of the general formulae can be obtained by, for example, the following method. Firstly, a monoazo compound is obtained through diazotization and coupling reaction between an aniline derivative and a naphthalene sulfonic acid derivative by a usual method. Secondly, a disazo compound is obtained after the monoazo compound is diazotized and then this monoazo compound is undergone a coupling reaction with an aminonaphthol disulfonic acid derivative.

(Regarding Coating Liquid)

The coating liquid can be obtained by dissolving or dispersing the organic dye in an appropriate solvent. The organic dye may be used alone or in combination of two or more thereof.

In the coating liquid, the organic dyes form supermolecules in the liquid. As a result, the coating liquid exhibits a liquid crystal phase. The liquid crystal phase is not particularly limited, and examples of the liquid crystal phase include a nematic liquid crystal phase, a middle phase, a smectic liquid crystal phase, a cholesteric liquid crystal phase, a hexagonal liquid crystal phase, and the like. The liquid crystal phase can be identified and confirmed from an optical pattern when observed by using a polarization microscope.

The solvent is not particularly limited and a conventionally known one can be used. The solvent which can dissolve the organic dye satisfactorily is preferably used. By using the coating liquid wherein the organic dye is satisfactorily dissolved, the organic dye does not precipitate easily when a film is formed.

For example, the solvent, which can dissolve the organic dye satisfactorily, is for example, an aqueous solvent.

Examples of the aqueous solvent include water, a hydrophilic solvent, and a mixed solvent containing water and the hydrophilic solvent. The hydrophilic solvent is a solvent, which can be dissolved with water uniformly. Examples of the hydrophilic solvent include, for example, alcohols such as methanol, ethanol; glycols such as ethylene glycol; cellosolves such as methyl cellosolve, ethyl cellosolve; ketones such as acetone; esters such as acetic ether; and the like. Preferably, the solvent is water or the mixed solvent containing water and the hydrophilic solvent.

The concentration of the organic dye in the coating liquid is preferably prepared so as to exhibit a liquid crystal phase. Specifically, the concentration of the organic dye is preferably 0.5 to 50% by mass. In the partial range of such concentration, the coating liquid may exhibit a liquid crystal phase.

In addition, the pH of the coating liquid is preferably prepared about pH 4 to 10 and more preferably about pH 6 to 8.

Further, an additive may be added to the coating liquid. Examples of the additive include a plasticizer, a heat stabilizer, a light stabilizer, a lubricant, an antioxidant, an ultraviolet absorber, a flame retardant, a coloring agent, an antistatic agent, an antifungus agent, a compatibilizing agent, a cross-linking agent, a thickening agent, various polymers and the like. The concentration of the additive in the coating liquid is preferably more than 0 and 10% by mass or less. A surfactant may be added to the coating liquid.

(Regarding Forming Optically Anisotropic Film)

The coating film may be formed by applying the coating liquid on an appropriate development surface.

The development surface is used for uniformly developing of the coating liquid. The type of the development surface is not particularly limited as far as it is proper to the object. Examples of the development surface include surfaces of a polymer film, a glass plate, a metallic drum, and the like. The oriented film may be used as a polymer film.

The oriented film has an orientation control force on its surface, and thus, it is able to surely orient the organic dye.

Preferably, a base material such as a polymer film and a glass plate is used as the development surface. The polymer film is not particularly limited, however, a film being excellent in transparency (for example, having a haze value of 5% or less) is preferable.

A thickness of the base material can be suitably designed in accordance with the strength and the like. However, in terms of thickness reduction and weight reduction, the thickness of the base material is preferably 300 μm or less, further preferably 5 to 200 μm, and more preferably 10 to 100 μm.

In general, a long base material is used in a mechanical manufacturing process. The length of the long base material is 10 m or more and preferably 300 m or more. When the long base material is used, in general, an optically anisotropic film is formed by a roll-to-roll method.

A surface of the base material may have an orientation control force. The orientation control force may be formed by subjecting an orientation treatment to the base material. Examples of the orientation treatment include a mechanical orientation treatment such as a rubbing treatment, a chemical orientation treatment such as an optical orientation treatment, and the like.

As a method for applying the coating liquid on the development surface, for example, an applying method using a suitable coater may be adopted.

When the coating liquid in a liquid crystal phase state is coated on the development surface, a shear force is applied to a supermolecular association of the organic dye during the process. Therefore, a coating film in which the supermolecular association is oriented in a predetermined direction can be formed on the development surface.

Next, the coating film is solidified. When an aqueous solvent is used as a solvent, the coating film is dried. As a method for drying the coating film, any of natural drying or forced drying may be adopted. The drying temperature is below or equal to the isotropic phase transition temperature of the coating liquid, and it is preferable to dry the coating film by gradually raising the temperature from low temperature to high temperature. Specifically, the drying temperature is preferably 10 to 80° C. and further preferably 20 to 60° C. Within such a temperature range, a dried coating film having small thickness variation can be obtained.

The drying time can be suitably selected in accordance with the drying temperature and the kind of the solvent. When the natural drying is adopted, the drying time is preferably 1 second to 120 minutes and further preferably 10 seconds to 5 minutes.

The oriented organic dye will be fixed in the drying process of the coating film. The coating film obtained by the drying process is an optically anisotropic film.

The thickness of the obtained optically anisotropic film (a dried coating film) is preferably 0.1 to 10 μm.

[Water Resistant Treatment Step]

A water resistant treatment step is a step of giving water resistance to an optically anisotropic film obtained by the film-forming step described above.

In the water resistant treatment step, a water resistant treatment liquid is brought into contact with the optically anisotropic film containing the organic dye mentioned above.

(Regarding Water Resistant Treatment Liquid)

A water resistant treatment liquid contains a multivalent cationic compound and a monovalent cationic compound.

The multivalent cationic compound is a compound having two or more valences. The multivalent cationic compound may be a compound containing one or more di- or more valent counter cations, a compound containing two or more monovalent counter cations, or a compound containing one or more di- or more valent counter cations and one or more monovalent counter cations.

The monovalent cationic compound is a compound having one valence. The monovalent cationic compound is a compound containing one monovalent counter cation.

Incidentally, a cationic compound is a compound that can dissociate when dissolved in water to exhibit cationic properties.

The multivalent cationic compound is not particularly limited, and examples include alkali earth metal salts, multivalent metal salts other than alkali earth metal salts, di- or more valent polyamine compounds, di- or more valent polyimine compounds, and the like.

The alkali earth metals include Ca, Cu, Mg, Zn, Fe, Co, Sr, and the like, and other multivalent metals include trivalent metals such as Al, Nd, Y, Fe, and La and the like.

The di- or more valent polyamine compounds include ethylenediamine, butanediamine, hexamethylenediamine, diethylenetriamine, and the like.

The multivalent cationic compound is used, in general, in the form of a salt. The salt includes a halogenated salt, a sulfate, a hydrochloride, a carbonate, a nitrate, a phosphate, and the like.

The valence of the multivalent cationic compound is not particularly limited so far as it is di- or more valent, and is preferably divalent to pentavalent, further preferably divalent or trivalent, and more preferably divalent. When the valence of the multivalent cationic compound is too high, there is a concern that the crosslinking points with the anionic group of the organic dye become excessively complicated. When the crosslinking points become excessively complicated, there is a concern that the orientation of the organic dye is disordered, and therefore, optical characteristics of the optically anisotropic film are lowered. On the other hand, when the valence of the multivalent cationic compound falls within the above range, the organic dye can be firmly crosslinked without disordering the orientation, without excessive increase in the number of crosslinking points with the organic dye.

As the multivalent cationic compound, preferably a di- or more valent polyamine compound or a salt thereof, further preferably a polyamine compound with a structure of two or more monovalent cationic species bonded to an alkyl chain or a salt thereof, and more preferably a polyamine compound with a structure of two or more monovalent cation species unadjacently bonded to an alkyl chain or a salt thereof is used. The polyamine compound may be either linear or branched, and it is preferably linear.

Specifically, as the multivalent cationic compound, for example, 1,2-ethylenediamine, 1,3-butanediamine, 1,4-butanediamine, 1,3-propanediamine, 1,6-hexamethylenediamine, and the like are used. These are a polyamine compound with a structure of two monovalent cationic species unadjacently bonded to an alkyl chain.

The multivalent cationic compound may be used alone or in combination of two or more types thereof.

The monovalent cationic compound is not particularly limited, and examples include alkali metal salts, monovalent amine compounds, ammonium salts, and the like.

The alkali metal salts include Li, Na, Ka, and the like. The monovalent amine compounds include primary amines such as methylamine, ethylamine, and aniline; secondary amines such as dimethylamine and diethylamine; tertiary amines such as trimethylamine and triethylamine; and the like.

The monovalent cationic compound is used, in general, in the form of a salt. The salt includes a halogenated salt, a hydrogen sulfate, a hydrochloride, a hydrogen carbonate, a nitrate, and the like.

The monovalent cationic compound is preferably an alkali metal salt and an amine compound or a salt thereof, and further preferably lithium chloride, sodium chloride, and a tertiary amine or a salt thereof.

The monovalent cationic compound may be used alone or in combination of two or more types thereof.

The water resistant treatment liquid contains one type or two or more types selected from the multivalent cationic compounds and one type or two or more types selected from the monovalent cationic compounds, and may contain other compounds within a range not impairing the effects of the present invention.

In the water resistant treatment liquid, the mass ratio of the multivalent cationic compound and the monovalent cationic compound (mass ratio=weight of monovalent cationic compound/weight of multivalent cationic compound) is 0.01 to 2.

When the mass ratio is less than 0.01, there is a concern that the reaction rate of water resistant treatment cannot be reduced. On the other hand, when the mass ratio exceeds 2, process of the water resistant treatment itself becomes difficult.

The mass ratio is preferably 0.02 or more, further preferably 0.03 or more, and more preferably 0.04 or more.

The mass ratio is preferably 1.8 or less, further preferably 1.5 or less and, more preferably 1.3 or less.

The multivalent cationic compound and the monovalent cationic compound are dissolved or dispersed into an appropriate solvent, whereby a water resistant treatment liquid can be obtained.

The solvent is not particularly limited, and in general, an aqueous solvent is used. As the aqueous solvent, those exemplified above for the coating liquid can be used.

The concentration of the multivalent cationic compound and the monovalent cationic compound in the water resistant treatment liquid is preferably 1 to 50% by mass and further preferably 5 to 30% by mass.

(Regarding Water Resistant Treatment)

The water resistant treatment liquid is brought into contact with one surface or both surfaces of the optically anisotropic film, whereby the water resistant optically anisotropic film can be obtained.

A method for bringing the water resistant treatment liquid into contact with the optically anisotropic film is not particularly limited. The contacting method includes methods of (A) coating the water resistant treatment liquid on the surface of the optically anisotropic film; (B) immersing the optically anisotropic film into a bath filled with the water resistant treatment liquid; (C) allowing the optically anisotropic film to pass through a bath filled with the water resistant treatment liquid; and the like.

The coating of the water resistant treatment liquid described in above (A) can be carried out by using an appropriate coater, spray, or the like.

Among them, the method of either immersing the optically anisotropic film into the water resistant treatment liquid described in above (B) or allowing the optically anisotropic film to pass through the water resistant treatment liquid described in above (C) is preferable. According to this method, the water resistant treatment liquid can be surely brought into contact with the whole of the optically anisotropic film. Also, according to this method, the water resistant treatment liquid is easy to penetrate into the optically anisotropic film.

When the optically anisotropic film is formed on a long base material, as shown in FIG. 1, it is preferred that the optically anisotropic film delivered in a manufacturing line be subjected to a water resistant treatment by allowing this film to pass through a bath filled with the water resistant treatment liquid.

FIG. 1 is a referential side view of an apparatus for water resistant treatment provided on the way of the roll-to-roll manufacturing line of the optically anisotropic film. In FIG. 1, the numeral 1 shows a long laminate in which a long base material and an optically anisotropic film are laminated; the numeral 2 shows a bath filled with a water resistant treatment liquid; the numeral 3 shows a water resistant treatment liquid; each of the numerals 41, 42, 43 and 44 shows a film conveying roller; and arrows stand for a delivery direction of the long laminate.

When the optically anisotropic film is brought into contact with the water resistant treatment liquid, the organic dyes in the optically anisotropic film are crosslinked with each other via the multivalent cationic compound. According to this crosslinking, an optically anisotropic film with excellent water resistance and mechanical strength is obtained.

According to the present invention, when an optically anisotropic film is made water resistant, generation of a crack in the film or separation of the film from the base material can be suppressed.

It was conjectured that the above effects are due to the following actions.

The water resistant treatment using a multivalent cationic compound proceeds by ion-exchange reaction. The ion-exchange reaction is an equilibrium reaction, and the reaction rate is attributed to the concentration of each component. As shown in the following formula (a), under the circumstance of the existence of organic dye A before water resistant treatment and multivalent cationic compound B, the ion-exchange reaction proceeds to the direction where they react to provide water resistance of the organic dye.

Monovalent cationic compound D is allowed to exist in this reaction system, as shown in the following formula (b), whereby water resistant organic dye C reacts with monovalent cationic compound D to generate A, thus equilibration of the reaction shifts to the left. Therefore, the rate of the ion-exchange reaction of organic dye A before water resistant treatment and multivalent cationic compound B can be reduced.

In the formulae (a) and (b), A represents an organic dye before water resistant treatment, B represents a multivalent cationic compound, C represents a water resistant organic dye, D represents a monovalent cationic compound, and E represents a counter ion of the organic dye (counter ion bonded to the organic dye before water resistant treatment).

  (a)

  (b)

In a conventional water resistant treatment, since the reaction rate of ion exchange of a counter ion bonded to an anionic group of the organic dye with a cation of the multivalent cationic compound in the water resistant treatment liquid is too high, rapid volume change occurs in the film. It is considered that this volume change occurs due to rapid expansion or contraction of the film.

In the present invention, the rate of the ion-exchange reaction of an organic dye and a multivalent cationic compound is controlled such that rapid volume change does not occur in the film. According to the manufacturing method of the present invention, a water resistant optically anisotropic film in which a defect such as a crack or separation is suppressed can be obtained. Indeed, when the rate of the ion-exchange reaction is too low, there is a concern that an optically anisotropic film is eroded by water, prior to the completion of water resistant treatment.

The present invention is characterized by using the water resistant treatment liquid having a mass ratio of 0.01 to 2 such that water resistance of the film can be completed without causing a defect in an optically anisotropic film, not just delaying the ion-exchange reaction.

[Cleaning Step]

The cleaning step is a step of cleaning the optically anisotropic film after the water resistant treatment (i.e., water resistant optically anisotropic film), using a cleaning liquid.

By performing the cleaning step, the water resistant treatment liquid remaining on the water resistant optically anisotropic film can be removed. Accordingly, it is possible to prevent precipitation of a salt of the multivalent cationic compound, a salt of the monovalent cationic compound or the like on the surface of the water resistant optically anisotropic film after the cleaning step.

The cleaning liquid is not particularly limited, and examples include water, a mixed liquid of water and a hydrophilic organic compound, a liquid hydrophilic organic compound, and the like.

As the hydrophilic organic compound, an organic compound having a polar group in a molecule thereof can be preferably used. The hydrophilic organic compound is preferably one which is in a liquid state at ordinary temperature (20° C.±15° C.).

The polar group means a functional group having polarity. The polar group includes functional groups containing oxygen atom and/or nitrogen atom with relatively large electronegativity.

Specific examples of the polar group include a hydroxyl group, an amino group, an amide group, an imino group, an imide group, a nitro group, a cyano group, an isocyanate group, a carboxyl group, an ester group, an ether group, a carbonyl group, a sulfonic acid group, an SO group, and the like.

Specific examples of the hydrophilic organic compound include linear or branched alcohols having 1 to 8 carbon atoms, such as methanol, ethanol and isopropyl alcohol; ketones such as acetone and methyl ethyl ketone; glycols such as ethylene glycol; chain ethers such as methyl cellosolve and ethyl cellosolve; cyclic ethers such as tetrahydrofuran; amides such as formamide and N-dimethylformamide; sulfoxides such as dimethyl sulfoxide; nitriles such as acetonitrile; esters such as ethyl acetate; and the like.

The hydrophilic organic compound may be used alone or in combination of two or more types thereof.

As the cleaning liquid, water or a mixed liquid of water and a hydrophilic organic compound is preferably used. This preferred cleaning liquid contains water, thus it is possible to efficiently remove the multivalent cationic compound or the like remaining on the film. On the other hand, since the water compatibilized with the hydrophilic organic compound is lowered in its polarity, even when the cleaning liquid containing a hydrophilic organic compound and water is used, a considerable amount of water does not penetrate into the water resistant optically anisotropic film.

When the cleaning liquid is a mixed liquid containing a hydrophilic organic compound and water, the concentration of the hydrophilic organic compound is 10% by mass or more, preferably 20% by mass or more and further preferably 40% by mass or more.

On the other hand, when the cleaning liquid is a mixed liquid containing a hydrophilic organic compound and water, an upper limit of the concentration of the hydrophilic organic compound is less than 100% by mass, preferably 95% by mass and further preferably 90% by mass.

When the content of the hydrophilic organic compound is too small, the polarity of water is not sufficiently lowered, so that there is a concern that water penetrates into the water resistant optically anisotropic film.

A method for cleaning the optically anisotropic film using the cleaning liquid is not particularly limited.

Examples include methods of (i) spraying the cleaning liquid onto the surface of the optically anisotropic film; (ii) immersing the optically anisotropic film into a bath in which the cleaning liquid flows in a predetermined direction; (iii) allowing the optically anisotropic film to pass through a cleaning bath filled with the cleaning liquid; and the like.

The temperature of the cleaning liquid is not particularly limited, but is in general 20° C. to 50° C. The time for exposing the optically anisotropic film to the cleaning liquid is not particularly limited, but is in general about 1 to 20 minutes.

After cleaning, in order to remove the cleaning liquid remaining on the surface of the water resistant optically anisotropic film, this film is dried.

As a method for drying the film, any of natural drying or forced drying may be adopted. The drying temperature is not particularly limited, but is in general 20° C. to 60° C. As the drying time, the drying may be performed until the surface of the film dries up.

The optically anisotropic film is cleaned using the cleaning liquid, whereby the water resistant treatment liquid remaining on the water resistant optically anisotropic film can be removed.

[Composition and Various Characteristics of Water Resistant Optically Anisotropic Film]

The content of the organic dye in the water resistant optically anisotropic film of the present invention is not particularly limited, but is preferably 80% by mass or more and less than 100% by mass and further preferably 90% by mass or more and less than 100% by mass, based on the total mass of the film.

Also, in addition to the organic dye, other component may be contained in the optically anisotropic film of the present invention.

The other component includes a multivalent cationic compound that functions as a crosslinking agent, other organic dyes (organic dyes other than the organic dye having an anionic group), various additives, arbitrary liquid crystalline compounds, polymers, or the like.

Also, the thickness of the water resistant optically anisotropic film is not particularly limited, but is preferably 0.1 μm to 10 μm. When the thickness of the water resistant optically anisotropic film is less than 1 μm, in order to secure self-supporting properties, the optically anisotropic film may be used in a state where it is laminated on a base material.

When an organic dye having absorption capacity in a visible light region is used, the water resistant optically anisotropic film containing the organic dye can be utilized as a polarizing film. When an organic dye which does not substantially have absorption capacity or has small absorption capacity in a visible light region is used, the water resistant optically anisotropic film containing the subject organic dye can be utilized as a retardation film.

When the water resistant optically anisotropic film of the present invention is a polarizing film, it exhibits absorption dichroism at a wavelength of at least a part of a visible light region (wavelength: from 380 nm to 780 nm). The transmittance of this optically anisotropic film is 35% or more, preferably 36% or more, and further preferably 37% or more. The degree of polarization thereof is 95% or more and preferably 98% or more.

[Use of Water Resistant Optically Anisotropic Film]

For example, the water resistant optically anisotropic film of the present invention may be used as a polarizing plate by laminating a protective film on one surface or both surfaces thereof.

The water resistant optically anisotropic film obtained by the manufacturing method of the present invention may be used in the state that the water resistant optically anisotropic film is laminated on the base material, or in the state that water resistant optically anisotropic film is peeled off from the base material.

When the water resistant optically anisotropic film is used in the state that the water resistant polarizing film is laminated on the base material, the base material may be used as a protective film.

The water resistant optically anisotropic film of the present invention is preferably mounted on an image display device.

Examples of the image display device having the water resistant optically anisotropic film of the present invention include a liquid crystal display device, an organic EL display, a plasma display, and the like. The preferable use of the image display device is a TV set.

EXAMPLES

The present invention will be described in detail by way of Examples and Comparative Examples. The present invention is not limited only to the following Examples. Each of measuring methods used in the Examples and the Comparative Examples are as follows:

[Observation Method of Liquid Crystal Phase]

A small amount of a coating liquid was sandwiched between two glass slides and observed a liquid crystal phase by using a polarization microscope (product name: "OPTIPHOT-POL," manufactured by Olympus Corporation).

[Measurement of Thickness of Optically Anisotropic Film]

A portion of the optically anisotropic film was peeled off from a polymer film and a step between the polymer film and the optically anisotropic film was measured by using a three-dimensional non-contact surface form measuring system (product name: "Micromap MM5200," manufactured by Ryoka Systems Inc.).

[Evaluation Method of Defect of Optically Anisotropic Film]

As to a laminate during the water resistant treatment and after the water resistant treatment, whether or not an optically anisotropic film was separated from a base material was visually observed. As the criteria of the evaluation, by observation, when the surface of the optically anisotropic film is in the state of being sore, it is determined as "separated", and when there is no sore on the surface of the optically anisotropic film, it is determined as "not separated".

The observation method was performed as follows.

In each step of (1) during immersing a laminate of a base material and an optically anisotropic film into a water resistant treatment liquid, (2) immediately after taking out the laminate from the water resistant treatment liquid, (3) after cleaning the laminate, and (4) after drying the laminate, whether or not the optically anisotropic film was separated from the base material was visually observed for each laminate (hereinafter, the observation of (1) to (4) is referred to as the observation of "laminate during the water resistant treatment").

Furthermore, for a laminate after drying of (4) described above, the laminate was placed on a back light, and whether or not the optically anisotropic film was separated from the base material while shedding a light from the back of the laminate was also visually observed (hereinafter, the observation of the laminate of (4) placed on a back light is referred to as the observation of "laminate after the water resistant treatment").

Example 1

4-nitroaniline and 8-amino-2-naphthalenesulfonic acid were caused to undergo diazotization and coupling reaction by a usual method (a method described on pages 135 to 152 of "Riron Seizoh, Senryo Kagaku (Theory Production, Dye Chemistry), 5th Version" written by Yutaka Hosoda, and published by Gihodo Shuppan Co., Ltd. on Jul. 15, 1968) to yield a monoazo compound. The resultant monoazo compound was diazotized by the usual method, and further the resultant was caused to undergo a coupling reaction with 1-amino-8-naphthol-2,4-disulfonic acid lithium salt, thereby yielding a crude product. This was salted out with lithium chloride to yield an disazo compound having the following structural formula (3):

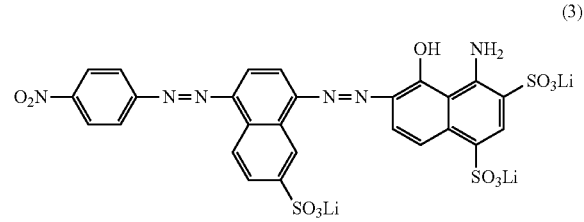

(3)

The disazo compound of the formula (3) was dissolved into ion exchange water to prepare a 20% by mass of coating liquid. The pH of this coating liquid was 7.8. This coating liquid was collected with a plastic syringe (Poly Spuit), and observed at room temperature (23° C.) in accordance with the observation method of the liquid crystal phase. As a result, the coating liquid exhibited a nematic liquid crystal phase.

The coating liquid was applied on a norbornene based polymer film (trade name: "ZEONOA" manufactured by Zeon Corporation) subjected to rubbing treatment and corona treatment by using a bar coater (product name: "Mayer rot HS4", manufactured by Bushman Co.). After that, the workpiece was naturally dried sufficiently in a thermostat of 23° C. The dried coating film formed on the polymer film by drying was an optically anisotropic film. The thickness of the optically anisotropic film was 0.4 µm.

To 80 parts by mass of ion-exchanged water were added 10 parts by mass of 1,3-butanediamine hydrochloride (manufactured by Sigma-Aldrich Co.) and 10 parts of lithium chloride (manufactured by Tokyo Chemical Industry Co., Ltd.), thereby preparing a 20% by mass water resistant treatment liquid.

The laminate of the polymer film and the optically anisotropic film was subjected to a water resistant treatment by being immersed into this water resistant treatment liquid for about 30 seconds.

Thereafter, the laminate was taken out from the water resistant treatment liquid, and thoroughly washed with water, then air-dried. A water resistant optically anisotropic film was prepared as described above.

As to the laminate during the water resistant treatment, when the surface of the optically anisotropic film was visually observed according to the evaluation method of defect of the optically anisotropic film, the optically anisotropic film did not separate from the base material (polymer film) in any step of (1) to (4) described above. Similarly, as to the laminate after the water resistant treatment, when the surface of the water resistant optically anisotropic film was visually observed, the optically anisotropic film was not separated from the base material.

Example 2

A water resistant optically anisotropic film was prepared in the same manner as in Example 1, except for using a water resistant treatment liquid to which 0.5 parts by mass of lithium chloride was added.

As to each laminate in each step during the water resistant treatment and after the water resistant treatment, when the surface of the water resistant optically anisotropic film was visually observed in the same manner as in Example 1, the optically anisotropic film was not separated from the base material.

Example 3

A water resistant optically anisotropic film was prepared in the same manner as in Example 1, except for using a water resisting treatment liquid to which sodium chloride was added instead of lithium chloride.

As to each laminate in each step during the water resistant treatment and after the water resistant treatment, when the surface of the water resistant optically anisotropic film was visually observed in the same manner as in Example 1, the optically anisotropic film was not separated from the base material.

Example 4

A water resistant optically anisotropic film was prepared in the same manner as in Example 1, except for using a water resisting treatment liquid to which triethylamine hydrochloride (manufactured by Tokyo Chemical Industry Co., Ltd.) was added instead of lithium chloride.

As to each laminate in each step during the water resistant treatment and after the water resistant treatment, when the surface of the water resistant optically anisotropic film was visually observed in the same manner as in Example 1, the optically anisotropic film was not separated from the base material.

Comparative Example 1

A water resistant optically anisotropic film was prepared in the same manner as in Example 1, except for using a water resistant treatment liquid to which lithium chloride was not added.

When the laminate during the water resistant treatment was observed, separation was observed at the point of the step of (1) described above.

Comparative Example 2

A water resistant optically anisotropic film was prepared in the same manner as in Example 1, except for using a water resistant treatment liquid to which 0.05 parts by mass of lithium chloride was added.

When the laminate during the water resistant treatment was observed, separation was observed at the point of the step of (1) described above.

Comparative Example 3

A water resistant optically anisotropic film was prepared in the same manner as in Example 1, except for using a water resistant treatment liquid to which 30 parts by mass of lithium chloride was added.

When the laminate during the water resistant treatment was observed, separation was observed at the point of the step of (1) described above.

TABLE 1

| | Monovalent Cationic Compound | Multivalent Cationic Compound | Additive Amount of Monovalent Cation (parts) | Additive Amount of Multivalent Cation (part) | Mass Ratio (Monovalent/Multivalent) | Evaluation for Separation |
|---|---|---|---|---|---|---|
| Example 1 | Lithium Chloride | 1,3-butanediamine hydrochloride | 10 | 10 | 1 | No separation was seen |
| Example 2 | Lithium Chloride | 1,3-butanediamine hydrochloride | 0.5 | 10 | 0.05 | No separation was seen |
| Example 3 | Sodium Chloride | 1,3-butanediamine hydrochloride | 10 | 10 | 1 | No separation was seen |

TABLE 1-continued

| | Monovalent Cationic Compound | Multivalent Cationic Compound | Additive Amount of Monovalent Cation (parts) | Additive Amount of Multivalent Cation (part) | Mass Ratio (Monovalent/Multivalent) | Evaluation for Separation |
|---|---|---|---|---|---|---|
| Example 4 | Triethylamine Hydrochloride | 1,3-butanediamine hydrochloride | 10 | 10 | 1 | No separation was seen |
| Comparative Example 1 | — | 1,3-butanediamine hydrochloride | 0 | 10 | 0 | Separation was seen |
| Comparative Example 2 | Lithium Chloride | 1,3-butanediamine hydrochloride | 0.05 | 10 | 0.005 | Separation was seen |
| Comparative Example 3 | Lithium Chloride | 1,3-butanediamine hydrochloride | 30 | 10 | 3 | Separation was seen |

[Evaluation]

The water resistant treatment was performed using a water resistant treatment liquid containing an appropriate amount of a monovalent cationic compound as in Examples 1 to 4, whereby a water resistant optically anisotropic film without a defect such as separation was obtained.

On the other hand, when a water resistant treatment liquid that did not contain a monovalent cationic compound was used as in Comparative Example 1, it is conjectured that the optically anisotropic film was distorted, and consequently separated from the base material. It is assumed that this distortion has occurred due to a rapid volume change occurred in the film since the reaction rate was too high. Incidentally, it could be seen from the result of Comparative Example 2 that the effect of suppressing separation was not seen also when the amount of the monovalent cationic compound for the multivalent cationic compound was too low. From the comparison between Example 2 and Comparative Example 2, it is considered that the effect of suppressing separation is exhibited when the mass ratio represented by monovalent cationic compound/multivalent cationic compound is approximately 0.01 or more.

On the other hand, also when a water resistant treatment liquid containing a large amount of a monovalent cationic compound was used as in Comparative Example 3, separation of film was occurred. It is conjectured that the reaction rate was contrarily too low, and dissolution was processed before the optically anisotropic film was made water resistant. It is considered that the effect of suppressing separation is exhibited when the mass ratio represented by monovalent cationic compound/multivalent cationic compound is approximately 2 or less, in order that the reaction rate is not reduced too much.

INDUSTRIAL APPLICABILITY

The method for manufacturing a water resistant optically anisotropic film of the present invention can be suitably utilized when an optically anisotropic film having excellent water resistance is manufactured.

The water resistant optically anisotropic film obtained by the manufacturing method of the present invention can be utilized in an image display device such as a liquid crystal display device, a polarized sunglass, and the like.

What is claimed is:

1. A method for manufacturing a water resistant optically anisotropic film, comprising:
    a water resistant treatment step of bringing an optically anisotropic film containing an organic dye having an anionic group into contact with a water resistant treatment liquid containing a multivalent cationic compound and a monovalent cationic compound;
    wherein the mass ratio of the multivalent cationic compound and the monovalent cationic compound contained in the water resistant treatment liquid, monovalent cationic compound/multivalent cationic compound, is 0.01 to 2.

2. The method for manufacturing a water resistant optically anisotropic film according to claim 1, wherein the monovalent cationic compound is an alkali metal salt.

3. The method for manufacturing a water resistant optically anisotropic film according to claim 1, wherein the monovalent cationic compound is an amine compound.

* * * * *